United States Patent [19]

Tordenmalm

[11] 4,358,989
[45] Nov. 16, 1982

[54] DEVICE FOR REDUCING PISTON VELOCITY IN A CYLINDER

[75] Inventor: L. Östen Tordenmalm, Sandby, Sweden

[73] Assignee: Akermans Verstad AB, Sweden

[21] Appl. No.: 160,311

[22] Filed: Jun. 17, 1980

[30] Foreign Application Priority Data

Jun. 20, 1979 [SE] Sweden ............................. 7905461

[51] Int. Cl.³ .................... F15B 13/16; F01B 15/06
[52] U.S. Cl. ........................................ 91/361; 91/196; 91/364; 92/118
[58] Field of Search ............................... 91/361, 364

[56] References Cited

U.S. PATENT DOCUMENTS 3,410,177 11/1968 Roess et al. ........................... 91/364
4,164,167 8/1979 Imai et al. ............................. 91/364

FOREIGN PATENT DOCUMENTS 2125982 9/1972 France .
2178549 11/1973 France .

Primary Examiner—Paul E. Maslousky
Attorney, Agent, or Firm—Blair, Brown & Kreten

[57] ABSTRACT

To reduce the piston velocity in a cylinder as the piston approaches the end positions, a signal transmitter is provided for sensing the position of a part driven by means of the piston and cylinder assembly, and thus of the piston in the cylinder. The signal of the signal transmitter is applied to a control unit in which it is compared with a signal from an actuator means. The signal from the actuator means controls the extension and shortening of the piston and cylinder assembly and the velocity at which this occurs, and may be positive or negative. The comparison of signals is so exploited that if it is established by this comparison that the piston is not in the areas of the end positions or, alternatively is in these areas but is activated by the actuator means to move away therefrom, the signal from the actuator means is not acted upon, whereas if the piston is in these areas and approaches the end positions, the hydraulic fluid supply to the piston and cylinder assembly is continuously reduced.

5 Claims, 6 Drawing Figures

DEVICE FOR REDUCING PISTON VELOCITY IN A CYLINDER

The present invention relates to a device in piston and cylinder assemblies for reducing the piston velocity as the piston approaches the end positions.

Many devices of different designs are known to produce such a reduction of the speed of movement of a piston. The commonest device is a transmitter which mechanically senses the position of the piston in the end area of the stroke in order to activate means for throttling the supply of hydraulic fluid. Devices of this type are however costly and difficult to mount and are not fully reliable. It is also known to design the piston and/or cylinder ends in a specific fashion, for instance by mounting on the piston a pin which projects into the mouth of the hydraulic fluid drainage channel to throttle the flow. Nor are solutions of this kind unobjectionable. In this context, it should also be pointed out that in many cases the piston movement is damped in the end areas, irrespective of whether the piston moves towards or away from the adjacent cylinder end. It is evident that a reduced piston movement is unnecessary when the piston moves away from adjacent cylinder end.

The object of the present invention is to overcome the above-discussed drawbacks in devices of this type and to provide a simple and safely operating device which does not require any specially designed piston and cylinder assembly or, for instance, any mechanical actuator means fixed on the piston rod.

According to the invention, the device comprises a cylinder, a piston reciprocating in the cylinder and connected to a part to be driven by the piston and cylinder assembly, a signal transmitter which is adapted to sense the position of said part, a control unit which is connected to said cylinder and said signal transmitter for controlling the supply of hydraulic fluid to the cylinder in response to signals from said signal transmitter, and an actuator means which is adapted to activate said control unit.

The actuator means is adapted to produce a positive or negative signal for lengthening and shortening, respectively, the piston and cylinder assembly at a velocity dependent upon the position of setting of said actuator means. Said signal is supplied to the control unit and compared therein with the signal from the position sensing signal transmitter such that if the positional signal has a value between a predetermined minimum value and a predetermined maximum value, the control unit will emit a hydraulic fluid supply controlling signal which is directly proportional to the setting of said actuator means. However, if the positional signal has a value below or above said predetermined minimum and maximum values, respectively, said control unit will emit a hydraulic fluid supply controlling signal which decreases the supply of hydraulic fluid so as to become a directly linear function of the distance of the piston to one end position if the signal of the actuator means is negative and the positional signal has a value below the minimum value or is positive and the positional signal has a value above the maximum value, but which is directly proportional to the setting of said actuator means when the signal of the actuator means is negative and the positional signal has a value above the maximum value or is positive and the positional signal has a value below the minimum value.

The invention will be described in greater detail hereinbelow with reference to the accompanying drawings in which:

FIG. 1 schematically shows an arrangement for a machine part pivoted by means of a piston and cylinder assembly, to which the invention is applicable;

Figure 4:
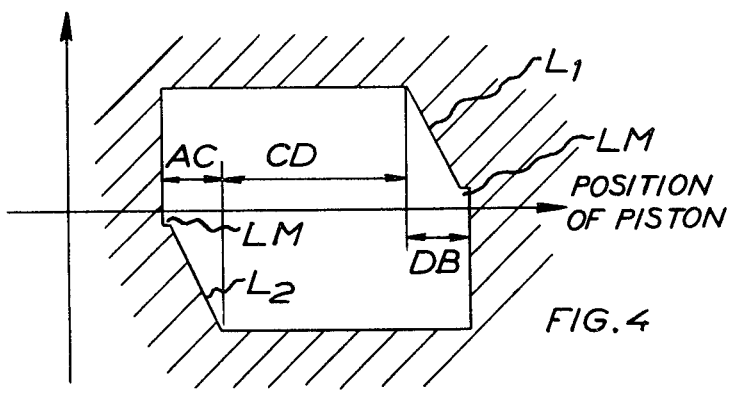
Figure 5:
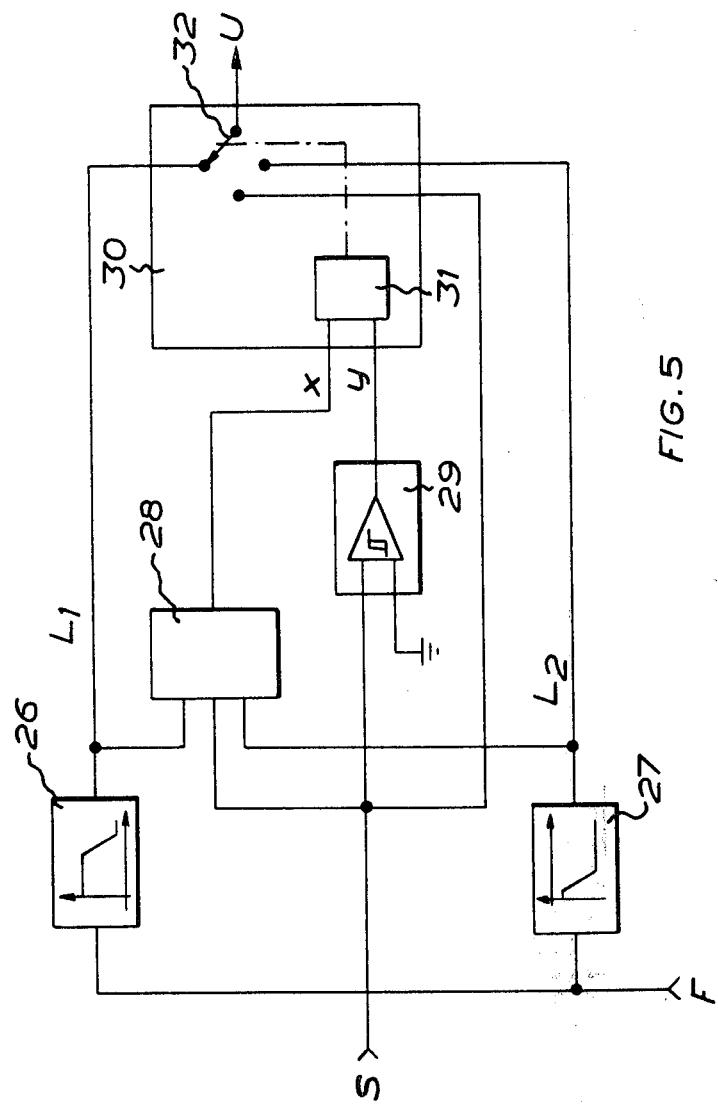
Figure 6:
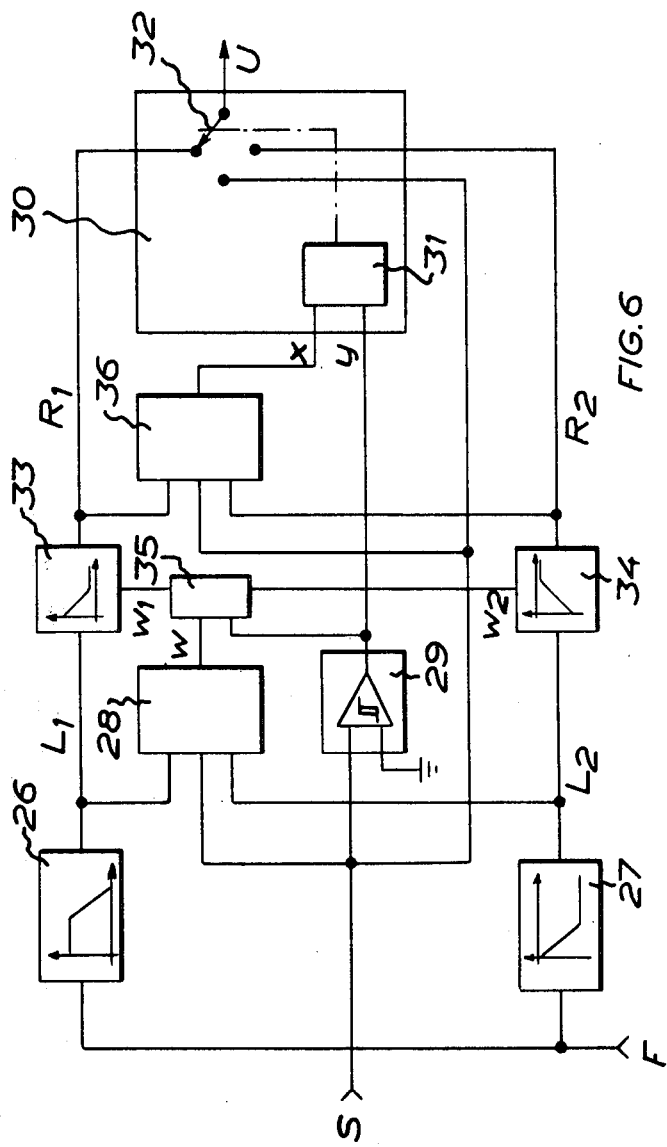

FIG. 4 graphically shows how the device of the invention works;

FIG. 5 shows one embodiment of restricting means incorporated in the device, and FIG. 6 is a modified embodiment of the restricting means.

Figure 1:
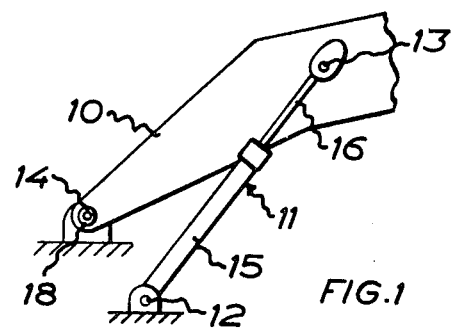

In FIG. 1, a machine part, for instance the jib of an excavator that is intended to pivot in one plane, is designated 10. To permit pivoting the part 10, there is provided a piston and cylinder assembly 11 which consists of a cylinder 15 which at one end is pivotally mounted on a stationary part, as shown at 12, and a piston rod 16 which is pivotally mounted at 13 on the part 10. The part 10 in turn is mounted on the stationary part at 14 and in the bearing 14 there is incorporated a signal transmitter 18 sensing the position of pivoting of the part 10 and emitting a signal responsive to that position, as will be described in greater detail below. It is obvious that if the piston and cylinder assembly 11 is extended or shortened to its opposite end positions without any damping at all, the assembly will be subjected to very great stresses, as will be the part 10 and the means associated therewith, the object of the invention being, as earlier pointed out, precisely to avoid such stresses.

Figure 2:
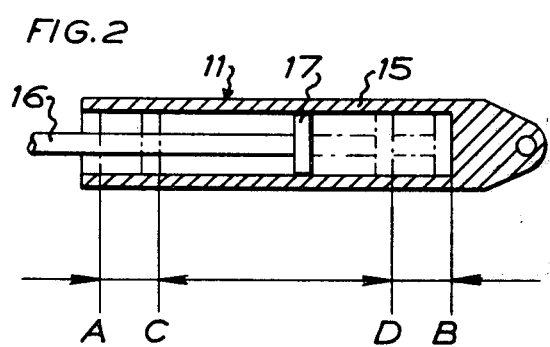
FIG. 2 is a sectional view of the piston and cylinder assembly in FIG. 1.

FIG. 2 is a cross-section of the piston and cylinder assembly 11 and shows the piston 17 reciprocating in a per se known fashion in the cylinder 15, and the piston rod 16 associated therewith. A and B designate the opposite inner end surfaces of the cylinder and the dashed lines illustrate two positions of the piston which are designated C and D. A damping of the movement of the piston 17 is desirable in the areas A–C and D–B as the piston is on its way towards the cylinder ends A and B, respectively.

Figure 3:
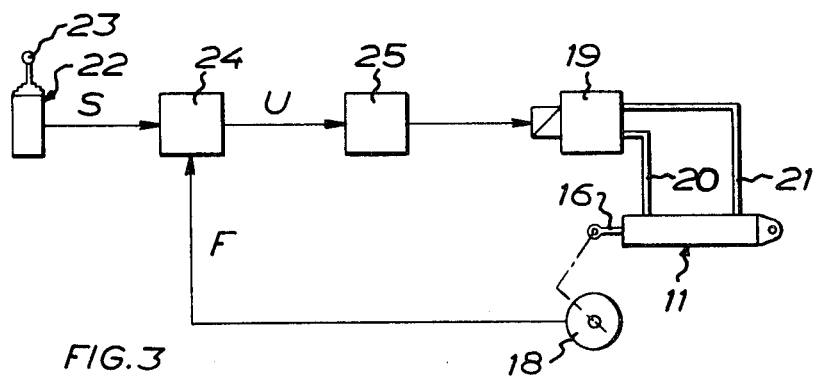
FIG. 3 shows the piston and cylinder assembly with associated control means.

FIG. 3 shows the principle construction of the invention. The piston and cylinder assembly 11 is controlled by a solenoid valve 19 supplying hydraulic fluid to the piston and cylinder assembly 11 through conduits 20 and 21. For draining hydraulic fluid, conduits are provided in a conventional fashion which, however, are not shown for crowding of the drawing. The signal transmitter 18 disposed in the bearing 14 of the machine part 10 is here connected to the piston rod, as shown by a dash-dot line, since the position of the machine part 10 is directly dependent on the position of the piston rod 16. The transmitter 18 emits a signal F. In order to operate the solenoid valve 19 there is provided an actuator means 22 having a control lever 23 which from a central position can be moved to the right in the drawing, such that a positive signal S is emitted, and to the left in the drawing, such that a negative signal S is emitted. The signals F and S are applied to the control unit 24 in which the signals are compared and which produces a signal U which by a power amplifier 25 is applied to the solenoid valve 19 to control the supply of hydraulic fluid to the piston and cylinder assembly 11. Now, it is assumed that a positive signal S on the actuator means 22 brings about a movement of the piston 17 and piston rod 16 to the right, the signal F from the signal transmitter 18 increasing while a negative signal S from the actuator means 22 produces a movement of the piston to the left and a decreasing signal F from the signal transmitter 18.

The control unit 24 having a restricting function is constructed as shown in FIG. 5 or 6. Referring to FIG. 5, the signal F of the signal transmitter 18 is applied to two linear amplifiers 26 and 27 each producing a signal $L_1$ and $L_2$, respectively. The signals $L_1$, $L_2$ are applied to a comparator 28 which is also supplied with the signal S from the actuator means 22. The comparator 28 compares the signal S with the signals $L_1$ and $L_2$. If $L_2 \leqq S \leqq L_1$, the output signal of the comparator is x=0. If $S<L_2$ or $S>L_1$, x=1. 29 designates another comparator which senses the signs of the signal S. If $S \geqq 0$, the output signal of the comparator 29 is y=0. If $S<0$, y=1. x and y are logic signals which are equal to either 1 or 0 and are address signals which are applied to the control unit 31 of a selector 30. The unit 31 controls a switch 32 as shown by dash-dot lines such that the output signal U of the selector 30 is equal to either $L_1$, $L_2$ or S depending upon the combination of x and y. The following Table applies to the output signal U:

| xy | U |
|----|----|
| 00 | S |
| 01 | S |
| 10 | $L_1$ |
| 11 | $L_2$ |

Thus, if S is positive (y=0), U is equal to the smallest of the signals $L_1$ and S and if S is negative (y=1) U is equal to the largest (absolutely the smallest) of the signals $L_2$ and S.

The control unit in FIG. 6 corresponds to that of FIG. 5, but, in addition, has timing means, preferably two ramp generators 33 and 34 each connected to the output of a linear amplifier 26 and 27, respectively. A gate 35 is connected to the outputs of the comparators 28 and 29 and the outputs of the gate 35 are connected each to one input of the ramp generators 33, 34. There is provided a further comparator 36 whose inputs are connected to the outputs of the ramp generators 33, 34 and to the output signal S of the actuator means. The output of the comparator 36 is connected to the control unit 31 of the selector 30. In this circuit, the comparator 28 compares the signal S of the actuator means with the signals $L_1$ and $L_2$. If $L_2 \leqq S \leqq L_1$, the comparator 28 emits a signal w=0. If $S<L_2$ or $S>L_1$, w=1. If the comparator 29 establishes that $S \geqq 0$, the emitted signal is y=0. If $S<0$, y=1. x, y and w are logic signals which are equal to either 1 or 0. The gate 35 allows the signal w to pass either to the ramp generator 33 (y=0, i.e. $S \geqq 0$) or to the ramp generator 34 (y=1, i.e. $S<0$). The signal from the gate 35 to the ramp generator 33 is designated $w_1$ and that from the gate 35 to the ramp generator 34 $w_2$. If w=0, $w_1=0$ and $w_2=0$. If w=1, $w_1=1$ and $w_2=0$ if y=0, but if y=1, $w_2=1$ and $w_1=0$. In other words, $w_2=y \cdot w$ and $w_1=\bar{y} \cdot w$, where the dot denotes logic AND -function and $\bar{y}$ denotes NOT-y.

The output signal, designated $R_1$ of the ramp generator 33 follows the input signal $L_1$ as long as $w_1=0$. When $w_1$ changes from 0 to 1, $R_1$ commences to drop linearly with time towards 0. $R_1$ is however always greater than LM. The same applies to the output signal $R_2$ of the ramp generator 34.

The comparator 36 compares the signal S from the actuator means with $R_1$ and $R_2$. If $R_2 \leqq S \leqq R_1$, the output signal x=0 is emitted. If $S<R_2$ or $S>R_1$, the signal x=1 is emitted. As in the former case, x and y are signals to the selector 30 whose output signal U is equal to either $R_1$, $R_2$ or S, depending on the combination of x and y. The following Table can be established for the output signal U.

| xy | U |
|----|----|
| 00 | S |
| 01 | S |
| 10 | $R_1$ |
| 11 | $R_2$ |

Thus, if S is positive (y=0), U is equal to the smallest of the signals $R_1$ and S, and if S is negative (y=1), U is equal to the greatest (absolutely the smallest) of the signals $R_2$ and S.

In actual practice, the control unit or restictor 24 operates as described hereinbelow, reference being now made to FIG. 4 which graphically illustrates the mode of operation. In FIG. 4, the output signal U from the control unit 24 is on the ordinate and the piston position of the piston and cylinder assembly is on the abscissa. The intervals designated AC, CD and DB correspond to those indicated in FIG. 2. Three cases may now arise, depending on the area in which the piston is.

(I) Area CD. The output signal U is equal to the signal S of the actuator means.

(II) Area DB. If the signal S of the actuator means is negative, the output signal U is equal to the signal of the actuator means. If, on the other hand, the signal of the actuator means is positive, the linear amplifier 26 produces the signal $L_1$ which thus is a linear function of the value sensed by the signal transmitter 18. $L_1=0$ at the right-hand end position and $L_1$ corresponds to a maximum positive control lever signal at the other end of the area DB. The output signal U is equal to the smallest of the signal S of the actuator means and the signal $L_1$.

(III) Area AC. If the signal S of the actuator means is positive, the output signal U is equal to the signal S of the actuator means. If, on the other hand, the signal S of the actuator means is negative, the linear amplifier 27 produces a signal $L_2$ which is a linear function of the value sensed by the signal transmitter 18. $L_2=0$ in the left-hand end position. $L_2$ corresponds to a maximum negative control lever signal at the other end of the area AC. The output signal U is equal to the absolutely smallest signal S of the actuator means and to $L_2$.

In order to ensure that the piston reaches the end positions, it is not permitted that the output signal U from the control unit 24 is absolutely smaller than the value LM.

The above defined arrangement affords the following advantages. Piston velocity is continuously reduced as the piston approaches its end positions. The lower piston velocity is, the closer to the end positions can the piston move before the velocity is reduced. The piston can move from the end positions at full speed and the gentleness of the braking can be selected in that the inclination of lines $L_1$ and $L_2$ in FIG. 4 is changed, i.e. by switching the linear amplifiers 26 and 27.

If the control unit 24 is constructed as shown in FIG. 6, it will operate in the following way. As in the previous instance, three cases may arise, depending on the area in which the piston is.

(I) Area CD. The output signal U is equal to the signal S of the actuator means.

(II) Area DB. If the signal S of the actuator means is negative, the output signal U is equal to the signal S of the actuator means. If the signal of the actuator means is positive, the signal $L_1$ is produced, which is 0 in the right-hand end position and equal to the maximum positive control lever signal at the other end of the area DB. Each time $L_1$ becomes smaller than the signal S of the actuator means, the ramp generator 33 emits a signal $R_1$ which decreases linearly with time and whose initial value is equal to the current value of $L_1$ and whose final value is 0. The output signal U is equal to the smallest of the signal S of the actuator means and the signal $R_1$.

(III) Area AC. If the signal S of the actuator means is positive, the output signal U is equal to the signal S of the actuator means. If the signal of the actuator means is negative, the linear amplifier 27 produces the signal $L_2$ which is a linear function of the value sensed by the signal transmitter 18. $L_2$ is equal to 0 in the left-hand end position and is equal to the maximum negative signal S of the actuator means at the other end of the area AC. Each time $L_2$ becomes absolutely smaller than the signal S of the actuator means, the ramp generator 34 emits a signal R2 absolutely decreasing linearly with time and whose initial value is equal to the current value of $L_2$ and whose final value is 0. The output signal U from the control unit is equal to the absolutely smallest of the signal S of the actuator means and the signal $R_2$.

In order to ensure that the piston reaches the end positions, it is not permitted that the output signal U is absolutely smaller than the value LM.

This arrangement affords the following advantages. Piston velocity is continuously reduced as the piston approaches the end positions. The lower piston velocity is, the closer to the end positions can the piston move before the speed is reduced. The piston can move away from the end positions at full speed. Since braking is ensured by time functions, there is no feed-back between piston position and piston velocity as in the first alternative. In some cases, such feed-back may cause oscillations. The inclination of $L_1$ and $L_2$ is so selected that adequately gentle braking can occur at all speeds. The inclination of $R_1$ and $R_2$ can also be so selected that the braking is terminated exactly in the respective end position.

What I claim and desire to secure by Letters Patent is:

1. In piston and cylinder assemblies, a device for reducing the piston velocity as the piston approaches the end positions, comprising:
   a cylinder,
   a piston reciprocating in the cylinder and connected to a part to be driven by the piston and cylinder assembly,
   a signal transmitter adapted to sense the position of said part,
   a valve means for controlling a fluid supply to said cylinder,
   an actuator means which is adapted to produce a positive or negative signal to lengthen and shorten, respectively the piston and cylinder assembly at a velocity dependent upon the position of setting of said actuator means, a control unit which is connected to said signal transmitter and said actuator means, said signal from said actuator means being applied to said control unit and compared therein with a signal from said position sensing signal transmitter such that if the positional signal has a value between a predetermined minimum value and a predetermined maximum value, said control unit emits a hydraulic fluid supply controlling signal to said valve means which is directly proportional to the setting of said actuator means, but if the positional signal has a value below or above said predetermined minimum or maximum values, respectively, said control unit emits a hydraulic fluid supply controlling signal which reduces the hydraulic fluid supply so as to become a directly linear function of the distances of the piston to its respective end position if the signal of said actuator means is negative and the positional signal has a value below the minimum value or if the actuator means signal is positive and the positional signal has a value above the maximum value, but which is directly proportional to the setting of the actuator means when the signal of the actuator means is negative and the positional signal has a value above the maximum value or it positive and the positional signal has a value below the minimum value.

2. Device as claimed in claim 1, comprising means in said control unit for sensing the velocity at which the piston and cylinder assembly is lengthened and shortened, respectively, to control the positions of said minimum and maximum values in dependence upon the velocity, such that a lower velocity decreases the minimum value and increases the maximum value.

3. Device as claimed in claim 1, in which said positional signal and said signal of said actuator means after being compared are applied to timing means such that when said signals imply a reduction of the hydraulic fluid supply, this will occur as a function of time.

4. Device as claimed in claim 1, in which said control unit includes two linear amplifiers which are supplied with said positional signal, a comparator which is supplied with the output signals of said linear amplifiers and the signal from said actuator means, a second comparator which is adapted to sense the signs of said signal from said actuator means, and a selector which is supplied with the signals from said comparators in order to select in response thereto between the signals from said actuator means and said linear amplifiers.

5. Device as claimed in claim 3, in which said control unit includes two linear amplifiers which are supplied with said positional signal, a first comparator which is supplied with the output signals of said linear amplifiers and said signal from said actuator means, a second comparator which is adapted to sense the signs of the signal from said actuator means, said timing means defined by two ramp generators whose inputs are connected to the outputs of said linear amplifiers and by a gate means to the outputs of said first and second comparators, a third comparator which is adapted to sense the signal from said actuator means and is connected to the outputs of said ramp generators, and a selector which is adapted to be supplied with the signals from said second and third comparators in order, to select in response thereto between the signals from said actuator means and said ramp generators.

* * * * *